UNITED STATES PATENT OFFICE.

MELVIN B. CHURCH, OF GRAND RAPIDS, MICHIGAN.

PLASTIC MATERIAL.

SPECIFICATION forming part of Letters Patent No. 255,937, dated April 4, 1882.

Application filed February 7, 1882. (No specimens.)

*To all whom it may concern:*

Be it known that I, MELVIN B. CHURCH, of Grand Rapids, in the county of Kent and State of Michigan, have invented a new and useful Improvement in Plastic Materials; and I do hereby declare that the following is a full, clear, and exact description of the same.

My invention is an improved plaster adapted for casts or moldings, and for the coating and finishing the walls of rooms and other surfaces. The principal ingredient of this improved plaster is calcined gypsum in a very finely divided condition, and in connection with the gypsum I also use glue as a hardening material.

Glue has heretofore been used in connection with finely-pulverized calcined gypsum as a covering for walls, in which the principal office of the glue was to retard the setting process while the compound was held in liquid form during the process of covering the walls, the glue also serving, in addition to this, to harden and thus improve the gypsum coating upon the wall after it had set. The glue is specially useful in connection with the gypsum, as it is absorbed into the gypsum and makes a close, strong texture, much harder and tougher than the pure gypsum; but the use of glue in connection with plaster for forming casts or like bodies or masses, which have to be molded into form, is impracticable, for the reason that the glue alone retards too long the setting of the plaster.

The object of my invention is to improve the compound of gypsum and glue as it has been applied to walls, and at the same time to render the same compound practically applicable to the formation of casts or other molded forms.

First, in respect to the compound, as heretofore used for covering walls or other surfaces, the absorption of the glue by the gypsum was never perfect, and varied greatly with varying differences of the temperature, so that often, by reason of the non-absorption of the glue, the compound would have the imperfect texture of a glue mixed with an inert powder—such as whiting or paris-white—in which no chemical change or combination ensues by which the glue ceases to exist in its original form and nature. This composition of glue and gypsum has been found practically useful for the purpose for which it was intended; but under certain circumstances, principally of differences of temperature, this difficulty of non-absorption of the glue and lack of chemical change has impaired the usefulness of the article, and the further difficulty has also been occasioned in coating the walls of rooms, that in warm weather several days must be allowed to elapse after applying the first coat before the second can be applied, in order to give the first coat time to harden and prevent it from being cut through by the brush in applying the second coat, which prevents a smooth and evenly coated surface. As heretofore stated, it has been impracticable to use the plaster and glue in a plastic form for making molded articles, for the reason that the plaster would not set with sufficient readiness.

In order to remedy all these difficulties I found that some substance was required to be added to the gypsum and glue which, upon exposure to the atmosphere, would cause the glue to be absorbed more readily by the gypsum, and would at the same time neutralize to some extent the retarding effect of the glue in respect to the setting of the plaster. I have discovered, after much study and experiment, that these desired results can be accomplished by adding to the compound of gypsum and glue a small proportion of sulphate of zinc. It will be understood that the gypsum and the glue must be in a very finely divided condition, that good glue must be used, and that the sulphate of zinc must be thoroughly and uniformly mixed with these ingredients. The substance may be mixed in a dry condition, and any suitable coloring-matter may be mixed therewith. The proportions I use are from five to eight pounds of the best glue with from one to one and a half pound of sulphate of zinc to each hundred pounds of the plaster. As before stated, the materials may all be mixed in a dry and powdered condition, or the glue and sulphate of zinc may be dissolved in water and the gypsum subsequently added.

This composition, when applied to walls or like surfaces, will set in suitable time to leave the whole in a good condition—that is to say, not so soon as to include unabsorbed water, which would give a dark appearance, but with sufficient rapidity to allow the workman to proceed as soon as it has dried (ordinarily in an hour or two) to apply another coat. Any number of coats may be applied to the same surface, and the whole will assume a perfectly homogeneous condition throughout, solid and free from any tendency to scale, and free from any unabsorbed glue.

As the sulphate of zinc serves the double purpose of neutralizing the retarding effect of the glue upon the setting of the plaster and of adding to the hardness of the material when set, it will be apparent that when the material is to be used in a plastic state for forming casts or any molded forms where a very hard and quick setting cement is required the proportions of the sulphate of zinc must be varied. Although no very exact limits need be set, about twice the relative amount heretofore specified of the sulphate of zinc may be used in connection with the plaster and glue, under the conditions last named. The workman can vary the amount as he desires it to set faster or slower, without material variation in the product. Some variation may also be made in the proportion of the glue.

In applying this material to walls by means of a brush under ordinary conditions of temperature, I take four measures of the mixed materials in a loose condition. This I dissolve in three measures of very hot water, and to the solution add two measures of cold water, when the material is ready to be applied to the wall. Only so much should be dissolved at a time as is needed for use for the day, and the material after being mixed should not be allowed to stand more than an hour without stirring. For extreme hot weather, for the first coat, the two measures of cold water should be omitted, and the mixture applied to form the first coat. The second coat may be the same as that first described.

When the material is to be used in a plastic condition, sufficient water only is required to reduce the material to that condition, and in that case the water should all be hot.

Other mineral salts may be used instead of the sulphate of zinc—that is to say, those of like character; but I believe the sulphate of zinc to be the best. I have tried copperas with good results, except that the color which it imparts is objectionable. For the best results I use a pulverized gypsum made according to process described in application filed by me in the United States Patent Office on the 16th day of December, 1881, this process giving a perfectly fine and perfectly uniform material. Calcined gypsum ground by the ordinary methods and bolted will invariably be made up of particles of different size, and these different grades of particles constantly tend to arrange themselves according to their gravity, and the larger settle to the bottom, which interferes with the perfect uniformity of work, and which cannot as well be attained.

Having thus described my invention, what I claim is—

The described compound, consisting of pulverized calcined gypsum, glue, and sulphate of zinc, or its equivalent, in substantially the proportions specified.

In testimony whereof I have signed my name to this specification in the presence of two subscribing witnesses.

MELVIN B. CHURCH.

Witnesses:
F. L. MIDDLETON,
E. A. DICK.